(12) United States Patent
Buckland et al.

(10) Patent No.: US 6,672,060 B1
(45) Date of Patent: Jan. 6, 2004

(54) COORDINATED CONTROL OF ELECTRONIC THROTTLE AND VARIABLE GEOMETRY TURBOCHARGER IN BOOSTED STOICHIOMETRIC SPARK IGNITION ENGINES

(75) Inventors: Julia Helen Buckland, Dearborn, MI (US); Ilya V. Kolmanovsky, Ypsilanti, MI (US); Lev Lezhnev, Moscow (RU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/208,558

(22) Filed: Jul. 30, 2002

(51) Int. Cl.⁷ .............................................. F02D 23/00
(52) U.S. Cl. ..................... 60/602; 60/605.1; 123/564
(58) Field of Search ................. 60/602, 605.1; 123/564

(56) References Cited

U.S. PATENT DOCUMENTS

| 4,005,578 | A | 2/1977 | McInerney ................... 60/602 |
| 4,005,579 | A | 2/1977 | Lloyd .......................... 60/602 |
| 4,556,038 | A | 12/1985 | Okamoto et al. ............. 60/602 |
| 5,477,840 | A | 12/1995 | Neumann .................... 60/602 |
| 5,771,867 | A | 6/1998 | Amstutz et al. ........... 60/605.2 |
| 6,035,640 | A | 3/2000 | Kolmanovsky et al. .... 60/605.2 |
| 6,058,708 | A | 5/2000 | Heinitz et al. ................. 60/602 |
| 6,067,800 | A | 5/2000 | Kolmanovsky et al. ....... 60/602 |
| 6,076,353 | A | 6/2000 | Freudenberg et al. ......... 60/602 |
| 6,178,749 | B1 | 1/2001 | Kolmanovsky et al. .... 60/605.2 |
| 6,209,530 | B1 | 4/2001 | Faletti et al. .............. 60/605.2 |
| 6,279,551 | B1 | 8/2001 | Iwano et al. ................ 60/605.2 |
| 6,308,517 | B1 | 10/2001 | Fausten et al. ............... 60/602 |
| 6,338,245 | B1 * | 1/2002 | Shimoda et al. .............. 60/285 |
| 6,408,625 | B1 * | 6/2002 | Woon et al. ................... 60/608 |
| 6,497,097 | B2 * | 12/2002 | Schmidt et al. ............... 60/602 |

FOREIGN PATENT DOCUMENTS

JP          58180726 A    * 10/1983    ........... F02B/37/12

* cited by examiner

Primary Examiner—Sheldon J. Richter (57) ABSTRACT

An engine control system and method wherein difference between an actual intake manifold pressure and a desired intake manifold pressure and a difference between an actual exhaust manifold pressure and a desired exhaust gas pressure are combined into a single feedback signal to control a variable geometry turbine. Simultaneously therewith, a difference between the actual intake manifold pressure and the desired intake manifold pressure is used to control throttle position.

15 Claims, 5 Drawing Sheets

COORDINATED CONTROL OF ELECTRONIC THROTTLE AND VARIABLE GEOMETRY TURBOCHARGER IN BOOSTED STOICHIOMETRIC SPARK IGNITION ENGINES

TECHNICAL FIELD

This invention relates to boosted engine control, and more particularly to the coordinated control of the electronic throttle and variable geometry turbocharger (VGT) in boosted stoichiometric spark ignition engines.

BACKGROUND AND SUMMARY OF THE INVENTION

As is known the art, with engines that operate with a stoichiometric air-to-fuel ratio, the engine torque response is directly linked to the cylinder airflow response, which in turn is linked with the intake manifold pressure response. Hence, fast response of intake manifold pressure with little overshoot in response to the driver's accelerator pedal command is essential to ensure adequate torque response in these engines. Fast response assures small turbo-lag, which is an extremely important drivability consideration in turbocharged engines. At the same time, overshoot in the intake manifold pressure is also very undesirable since it may translate into the engine torque overshoot and drivability concerns.

Consider a stoichiometric spark ignition engine configuration where a compressor of a turbocharger drives air to the intake manifold of the engine through a variable electronic throttle, such compressor being driven by a variable geometry turbine (VGT) fed by combustion gases in the exhaust manifold of the engine and controlled by a control signal $u_{vgt}$ produced by the engine control unit (ECU). It is clear that the electronic throttle can respond very fast and has a lot of authority over the intake manifold pressure when such throttle is not fully open. Therefore, the electronic throttle can be controlled by the engine control unit (ECU) to respond to a difference between a measured and desired intake manifold pressure so that the measured intake manifold pressure is driven to the desired pressure quickly and with small overshoot. The error signal that drives the electronic throttle thus has the following form:

$$e_{throttle} = (p_{intake} - p_{intake,desired}).$$

where:

$e_{throttle}$ is the intake manifold pressure error used in formation of the throttle control signal;

$p_{intake}$ is the measure intake manifold pressure; and $p_{intake,desired}$ is the desired intake manifold pressure.

When the throttle is close to being fully open, its authority over the intake manifold pressure is much decreased. Hence, the VGT has to be used to affect the intake manifold pressure in this situation. There are three natural choices for VGT feedback control in this situation. The VGT can be controlled either based on the difference between (1) measured and desired intake manifold pressure, or (2) measured and desired mass air flow (measured before the compressor), or (3) measured and desired exhaust manifold pressure.

In accordance with the present invention, an engine control system and method are provided wherein a difference between an actual intake manifold pressure and a desired intake manifold pressure and a difference between an actual exhaust manifold pressure and a desired exhaust gas pressure are combined into a single feedback signal to control the VGT while the difference between the actual intake manifold pressure and the desired intake manifold pressure is used to control throttle position.

More particularly, we have determined that none of all these three choices described above is totally desirable. We have established that the feedback on the intake manifold pressure (i.e., (1) above) does provide fast response with small overshoot. Since the same measurement is used to control both the throttle and the VGT, however, it can be confirmed that robustness properties of such a system to variations in the engine parameters caused by, for example engine aging, are not good.

The feedback on mass air flow (i.e., (2) above) is not particularly desirable since in steady-state, mass air flow (MAF) (as measured by MAF sensor located before the compressor) is equal to the cylinder flow, which in turn is determined by the intake manifold pressure. Since the parameters of the engine change, the desired values of the intake manifold pressure and mass air flow can be rendered inconsistent, i.e., they cannot be achieved simultaneously in steady-state. This may cause an unpredictable deterioration in controller and engine behavior when the controller tries to achieve both of these setpoints (i.e., desired intake manifold pressure and desired mass airflow).

Finally, we have recognized that for fast response of the intake manifold pressure at tip-ins the exhaust manifold must exhibit a significant overshoot (a flare). This flare assists in quickly spinning up the turbocharger and minimizing the turbo-lag that would otherwise be significant in the response. Controlling VGT as to keep the exhaust manifold pressure close to its steady-state set-point (i.e., (3) above) will eliminate the flare and will increase the turbo-lag (i.e., decrease the speed of response).

From these considerations, in accordance with the present invention, error signals comprising: (1) a difference between measured intake manifold pressure and a desired intake manifold pressure; and (2) a difference between measured exhaust manifold pressure and desired exhaust manifold pressure are combined into a single feedback signal, $e_{vgt}$, for the variable geometry turbine, where $e_{vgt}$, is:

$$e_{vgt} = W \cdot (p_{intake} - p_{intake,desired}) + (1-W) \cdot (p_{exhaust} - p_{exhaust,desired}).$$

The weight w is a variable chosen by the control system designer for the system under consideration. It weights the relative influence of intake and exhaust manifold pressure on $e_{vgt}$. The weight w multiplying the intake manifold pressure error is set between 0 and 1 but close to 1 to provide fast transient response in the intake manifold pressure with small overshoot. The small non-zero weight (1−w) on the exhaust manifold pressure error improves the robustness of the controller to parameter variations in steady-state. We found that the value of w=0.8 results in quite good responses.

The controller (e.g. ECU) that drives the throttle and VGT can now be fully specified. It applies proportional plus integral action to both $e(t)_{throttle}$ and $e(t)_{vgt}$ and adds the results of such actions to the feedforward terms of nominal throttle position signal $u_{throttle,desired}(t)$ and nominal VGT position signal $u_{vgt,desired}(t)$, respectively. Thus, the control signal fed to the VGT is $u_{vgt}(t)$ and the signal fed to the throttle is $u_{throttle}(t)$ where:

$$u_{throttle}(t) = u_{throttle,desired}(t) + k_{p,throttle} e_{throttle}(t) + k_{i,throttle} z_{throttle}(t),$$

$$z_{throttle}(t) = z_{throttle}(t-\Delta T) + e_{throttle}(t),$$

$$u_{vgt}(t) = u_{vgt,des}(t) + k_{p,vgt} e_{vgt}(t) + k_{i,vgt} z_{vgt}(t),$$

$$z_{vgt}(t) = z_{vgt}(t-\Delta T) + e_{vgt}(t),$$

and where $\Delta T$ is the sampling period. The proportional controller gains, $k_{p,throttle}$ and $k_{p,vgt}$ and the integral controller gains $k_{i,throttle}$ and $k_{i,vgt}$, can be made functions of engine speed and intake manifold pressure demand and can be stored in appropriate look-up tables.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
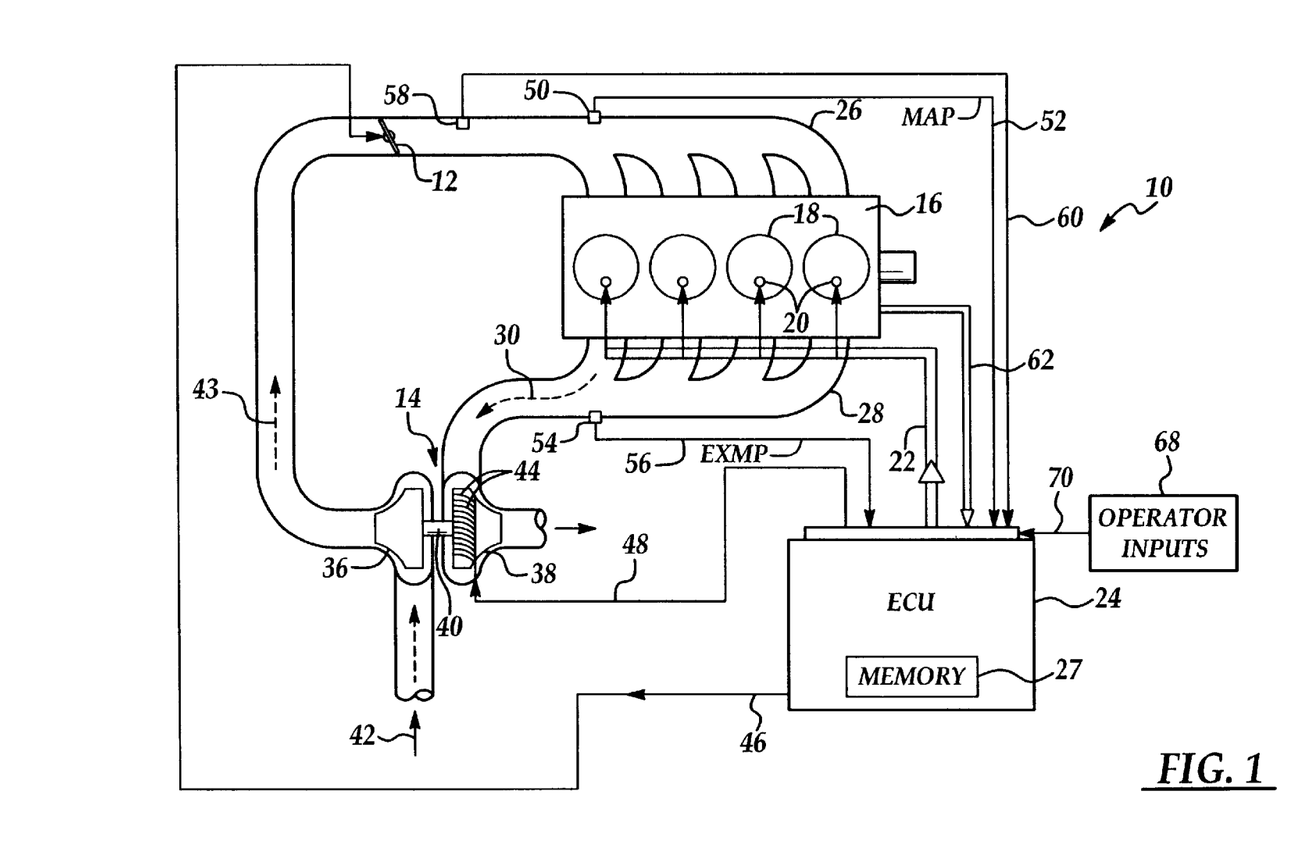
FIG. 1 is a simplified schematic diagram of a stoichiometric spark ignition engine system according to the invention.

Referring now to FIG. 1, a simplified schematic diagram of a stoichiometric spark ignition an engine system 10 is shown. The engine system 10 equipped with a variable geometry turbocharger (VGT) 14. A representative engine block 16 is shown having four combustion chambers 18, it being understood that additional (or fewer) combustion chambers may be used. Each of the combustion chambers 18 includes a direct-injection fuel injector 20. The duty cycle of the fuel injectors 20 is determined by the engine control unit (ECU) 24 and transmitted along signal line 22. Air enters the combustion chambers 18 through the intake manifold 26, and combustion gases are exhausted through the exhaust manifold 28 in the direction of arrow 30.

The turbocharger 14 uses exhaust gas energy to increase the mass of the aircharge delivered to the engine combustion chambers 18. The exhaust gas flowing in the direction of arrow 30 drives the turbocharger 14. This larger mass of air can be burned with a larger quantity of fuel, resulting in more torque and power as compared to naturally aspirated, non-turbocharged engines.

The turbocharger 14 consists of a compressor 36 and a turbine 38 coupled by a common shaft 40. The exhaust gas 30 drives the turbine 38 which drives the compressor 36 which, in turn, compresses ambient air 42 and directs it (arrow 43) into the intake manifold 26 via an electronically controlled throttle 12.

All of the engine systems, including the throttle system 12, VGT 14 and fuel injectors 20 are controlled by the ECU 24. More particularly, the ECU 24 has a storage medium 27 for storing a program (i.e., computer code) to execute the processes described herein and described herein in connection with FIGS. 3 and 5. For example, control signal $u_{throttle}(t)$ on line 46 from the ECU 24 regulates the throttle 12 position, and a control signal $u_{vgt}(t)$ signal 48 regulates the position of the VGT guide vanes 44. Sensors and calibratable lookup tables provide the ECU 24 with engine operating information. For example, manifold absolute pressure (MAP) sensor 50 provides a MAP (i.e., $P_{intake}$) signal 52 to the ECU 24 indicative of the pressure in the intake manifold 26. Likewise, exhaust manifold pressure (EXMP) sensor 54 provides an EXMP (i.e., $P_{exhaust}$) signal 56 to the ECU 24 indicative of the pressure in the exhaust manifold 28. Additional sensory inputs can also be received by the ECU along signal line 62 such as engine coolant temperature and engine speed. Additional operator inputs 68 are received along signal 70, for example as accelerator pedal position.

Figure 2:
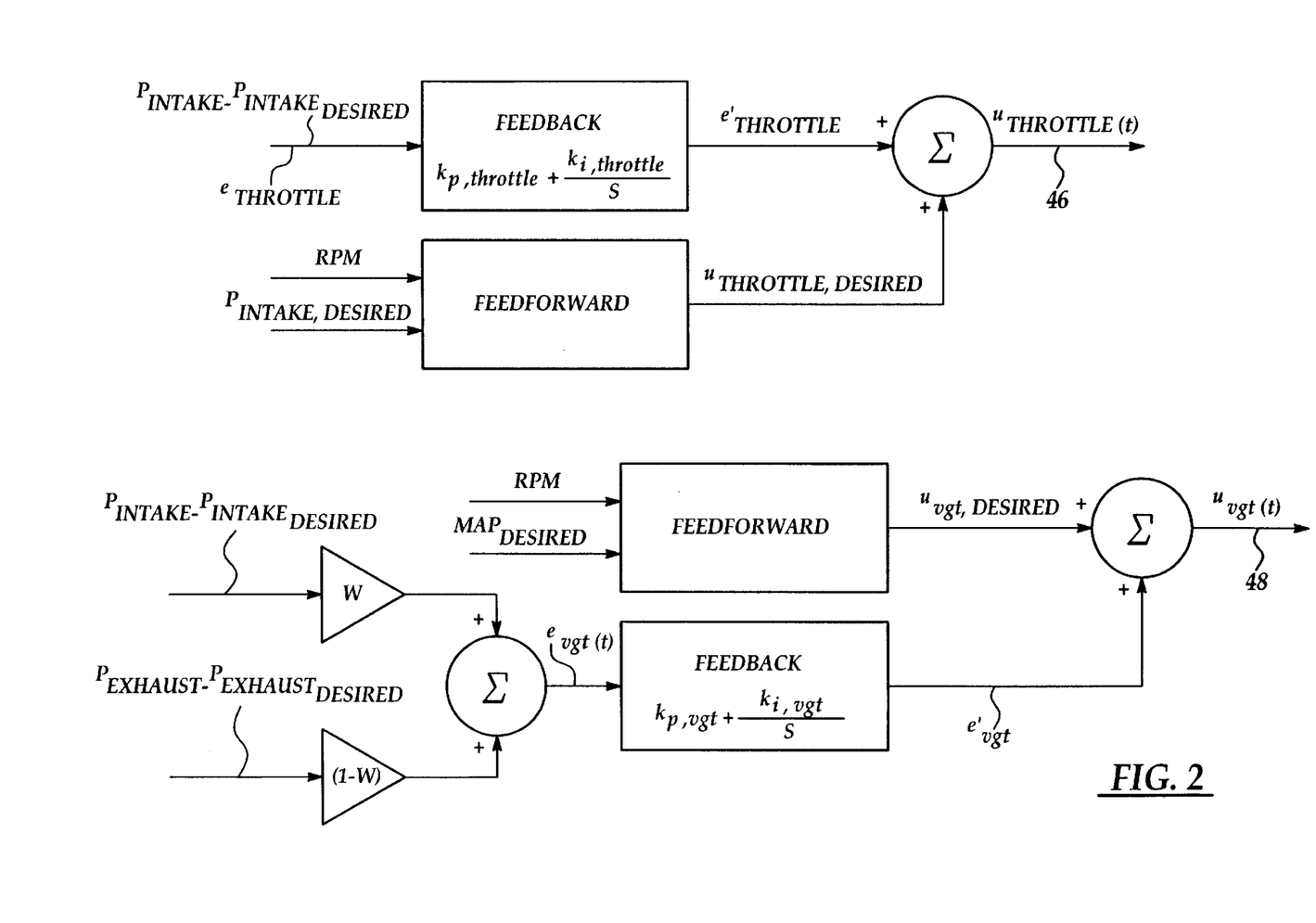
FIG. 2 is a block diagram useful in understanding the generation of a control signal $u_{throttle}(t)$ for an electronic throttle used in the system of FIG. 1 and a control signal $u_{vgt}(t)$ for a VGT used in the system of FIG. 1.

The VGT 14 is modified as a function of a control signal $u_{vgt}(t)$, where t is time, to be described hereinafter. Suffice it to say here, however, that the control signal $u_{vgt}(t)$ on line 48 has two components: (1) a nominal component $u_{vgt,desired}(t)$ which is modified as a function of measured engine speed (RPM) and a desired intake manifold pressure as determined by the ECU 24 and; (2) a component $e_{vgt}'(t)$ which is a function of: (a) a difference between measured intake manifold pressure $p_{intake}$ and the desired intake manifold pressure $p_{intake,desired}$; and (b) a difference between measured exhaust manifold pressure $p_{exhaust}$ and desired exhaust manifold pressure $p_{exhaust,desired}$ as determined by the ECU 24. The two components $u_{vtg,desired}$ and $e_{vgt}'(t)$ are combined into a single feedback signal, $u_{vgt}$, as shown on FIG. 2 for the variable geometry turbine, where $e_{vgt}$, is:

$$e_{vgt} = W \cdot (p_{intake} - p_{intake,desired}) + (1-W) \cdot (p_{exhaust} - p_{exhaust,desired}).$$

The weight w is a variable chosen by the control system designer for the system under consideration. It weights the relative influence of intake and exhaust manifold pressure on $e_{vgt}$. The weight w multiplying the intake manifold pressure error is set between 0 and 1 but close to 1 to provide fast transient response in the intake manifold pressure with small overshoot. The small non-zero weight (1−w) on the exhaust manifold pressure error improves the robustness of the controller to parameter variations in steady-state. We found, that the value of w=0.8 results in quite good responses.

In any event, the control signal $u_{vgt}(t)$ varies the turbine flow area and the angle at which the exhaust gas 30 is directed at the turbine blades. This is accomplished by changing the angle of the inlet guide vanes 44 on the turbine 38.

As noted above, the engine system 10 includes the electronically controlled throttle 12. As can be appreciated from FIG. 1, both the throttle 12 and the VGT 14 regulate gas flow to the intake manifold 26. The throttle system 12 is controlled by a control signal $u_{throttle}(t)$. The throttle control signal $u_{throttle}(t)$ is a composite signal comprising (1) a nominal component $u_{throttle,desired}(t)$ which, as shown in FIG. 2, is a function of measured engine speed (RPM) and desired intake manifold pressure $p_{intake,desired}$; and (2) a component $e_{throttle}'(t)$ which is a function of:

$$e_{throttle} = (p_{intake} - p_{intake,desired}).$$

where:

$e_{throttle}$ is the intake manifold pressure error used in formation of the throttle control signal;

$p_{intake}$ is the measure intake manifold pressure; and $p_{intake,desired}$ is the desired intake manifold pressure.

More particularly, the signal $u_{throttle}$ on line 46 that controls the electronically controlled throttle 12 and the signal $u_{vgt}$ on line 48 that drive the VGT 38 can now be more fully specified. Thus, as shown in FIG. 2, the ECU 24 applies proportional plus integral control action to $e_{throttle}$ and $e_{vgt}$, in addition to feedforward of the nominal throttle, $u_{throttle,desired}$, and VGT, $u_{vgt,desired}$, signals. Thus, the signal $u_{throttle}$ on line 46 the signal $u_{vgt}$ on line 48 may be expressed as:

$$u_{throttle}(t)=u_{throttle,desired}(t)+k_{p,throttle}e_{throttle}(t)+k_{i,throttle}z_{throttle}(t),$$

$$z_{throttle}(t)=z_{throttle}(t-\Delta T)+e_{throttle}(t),$$

$$u_{vgt}(t)=u_{vgt,desired}(t)+k_{p,vgt}e_{vgt}(t)+k_{i,vgt}z_{vgt}(t),$$

$$z_{vgt}(t)=z_{vgt}(t-\Delta T)+e_{vgt}(t),$$

where $\Delta T$ is the sampling period. The proportional controller gains, $k_{p,throttle}$ and $k_{p,vgt}$ and the integral controller gains $k_{i,throttle}$ and $k_{i,vgt}$, can be made functions of engine speed and intake manifold pressure demand and can be stored in appropriate look-up tables.

Figure 3:
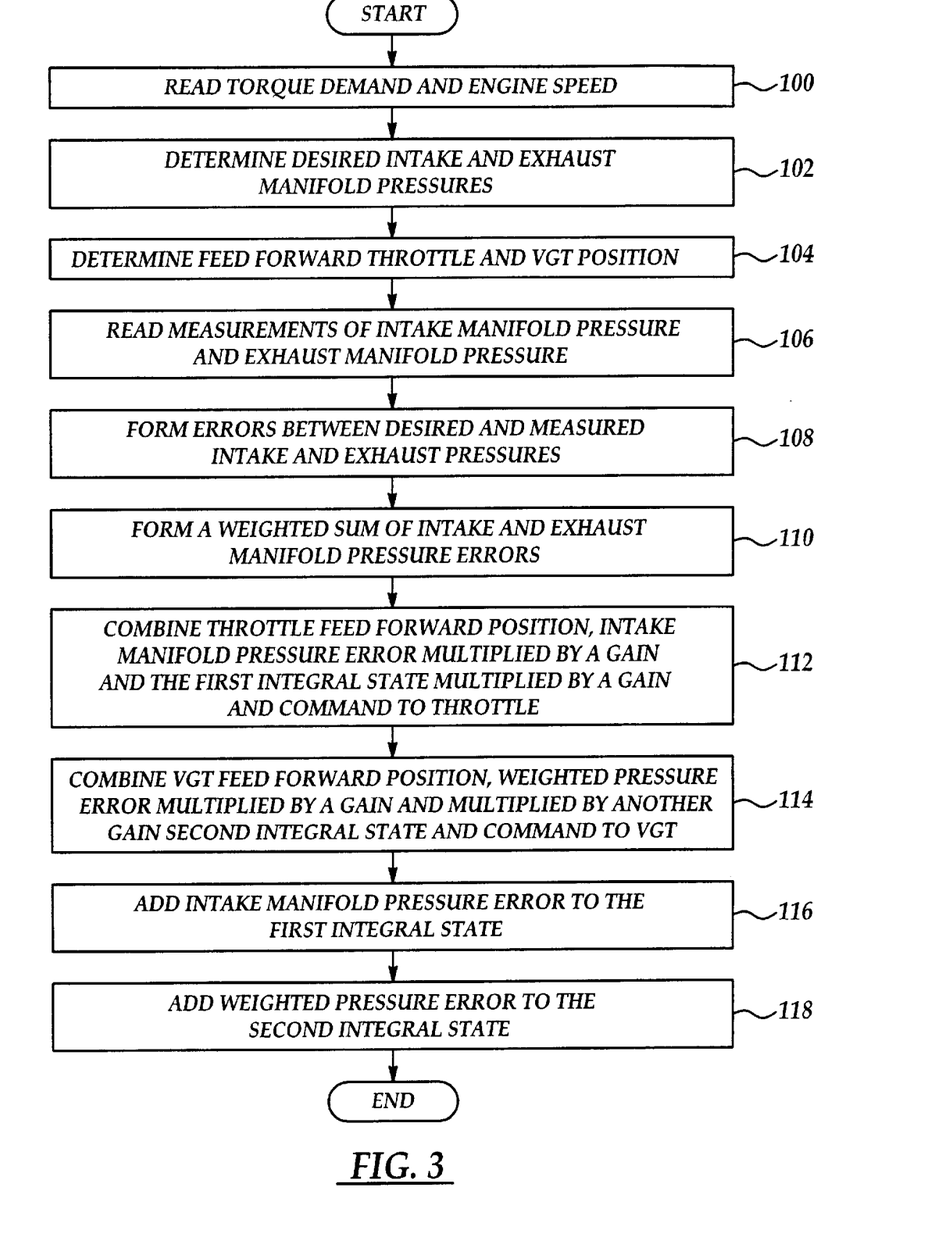
FIG. 3 is a flow diagram of a process performed computer code stored on a computer media in an engine control unit (ECU) of the system of FIG. 1, such ECU when executing such code, performing a process used to produce the control signal $u_{throttle}(t)$ for an electronic throttle used in the system of FIG. 1 and the control signal $u_{vgt}(t)$ for the VGT used in the system of FIG. 1.

The block diagram in FIG. 3 details this feedback controller operation. More particularly, in Step 100 the ECU 24 reads the torque demand (a function of operator accelerator action) and engine speed (measured RPM). In Step 102, the ECU 24 determines from such readings the desired intake and exhaust manifold pressures $p_{intake,desired}$, $p_{exhaust,desired}$. In Step 104, the ECU 24 determines the feed forward throttle signal $u_{throttle,desired}$ and the feed forward VGT signal $u_{vgt,desired}$ (FIG. 2) in accordance with read engine speed (RPM) and determined desired intake manifold pressure $p_{intake,desired}$. In Step 106, the ECU 24 reads measurements of intake manifold pressure $p_{intake}$ and exhaust manifold pressure $p_{exhaust}$. In Step 108, the ECU 24 forms a first error signal, $e_{throttle}(t)$ between desired and measured intake pressure (i.e., $p_{intake}-p_{intake,desired}$), and a second error signal between the desired and measured exhaust pressure (i.e., $p_{exhaust}-p_{exhaust,desired}$). In Step 110 the ECU 24 forms the weighted sum of the formed $p_{intake}-p_{intake,desired}$, and the formed $p_{exhaust}-p_{exhaust,desired}$, as described above:

$$e_{vgt}=W\cdot(p_{intake}-p_{intake,desired})+(1-W)\cdot(p_{exhaust}-p_{exhaust,desired})$$

and in connection with FIG. 2. In Step 112, the ECU 24 combines throttle feed forward position $u_{throttle,desired}$, with the first error signal $e_{throttle}(t)$ multiplied by a gain $k_{p,throttle}$ and the first integral state multiplied by a gain $k_{i,throttle}$ (i.e., $e'_{throttle}(t)$ described above) to produce a first composite signal $u_{throttle}=e'_{throttle}(t)+u_{throttle,desired}$. In Step 114, the ECU 24 combines feed forward VGT signal $u_{vgt,desired}$ with the weighted pressure error $e_{vgt}(t)$ multiplied by a gain $k_{p,vgt}$ and the second integral state multiplied by $k_{i,vgt}$ (i.e., $e'_{vgt}(t)$) described above) to produce a second composite signal $u_{vgt}$. For discrete implementation Steps 116 and 118 are employed, where the integral states in the throttle and VGT controllers are updated based on the latest measurement information. The first composite signal $u_{throttle}$ is fed to the throttle via line 46 and the second composite signal $u_{vgt}(t)$ is fed to the VGT via line 48.

In engine configurations where an external exhaust gas recirculation (EGR) valve is present, the coordination mechanism in large transients remains essentially unchanged since the EGR valve would be closed in such transients.

It is possible to further improve the speed of response if the future pressure demand (or, equivalently, driver's torque demand) can be anticipated in advance. The anticipation of the future intake manifold pressure demand can be based on the previous driving history, GPS measurements and road grade maps, vehicle communication and traffic information systems as well as based on transmission shift commands. The basic approach is to pass the intake and exhaust manifold pressure set-points (i.e., the desired values) to the VGT loop in advance of the actual step. The resulting control action is to move the VGT to a more closed position thereby spinning-up the turbocharger and building up compressor pressure before the need to increase the torque output actually arises. The throttle loop operates on the current intake manifold pressure set-point value thus preventing the advanced VGT closing from affecting the intake manifold pressure. Using such information enables significantly faster responses with small overshoot.

Figure 4:
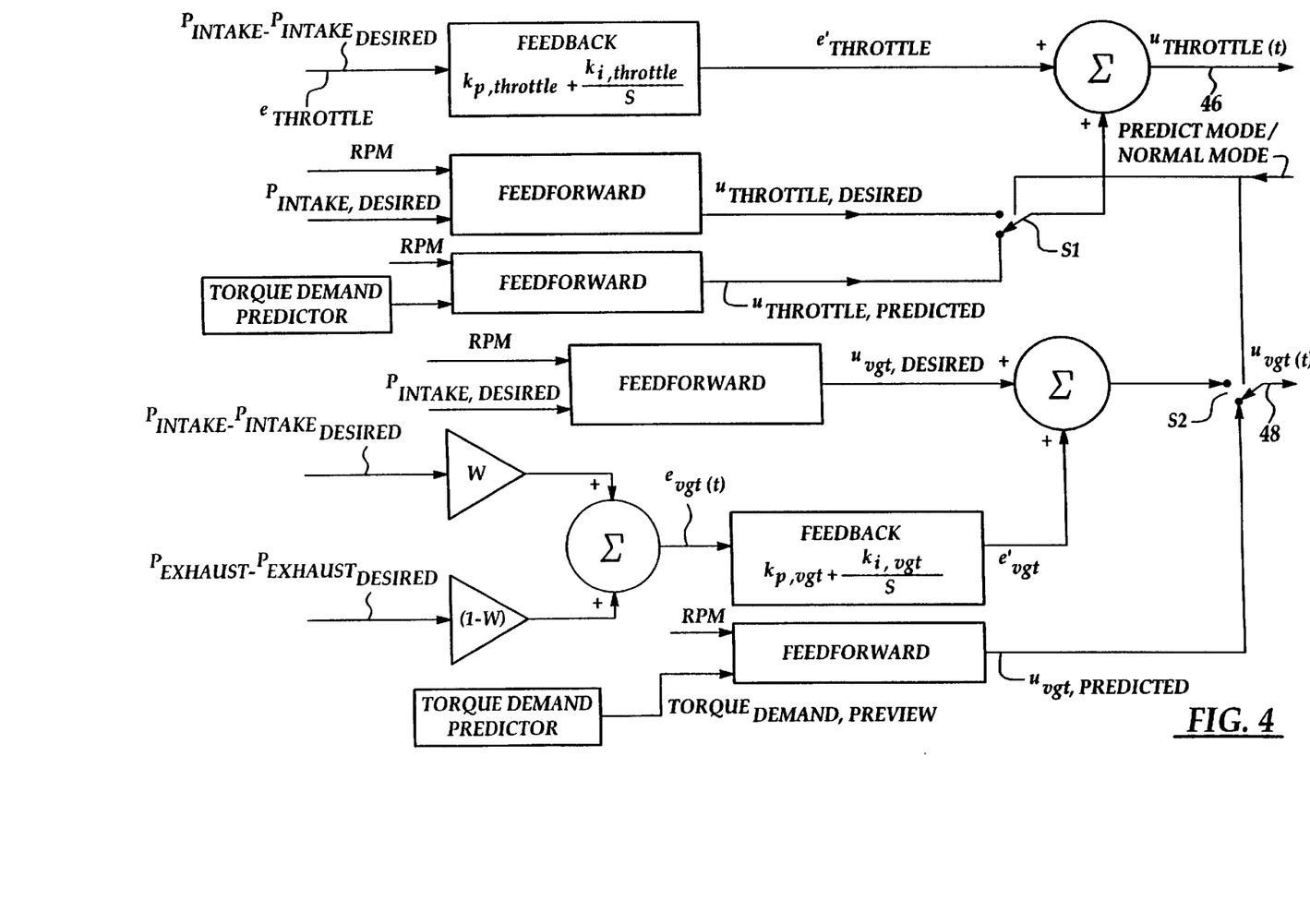
FIG. 4 is a block diagram useful in understanding the generation of a control signal $u_{throttle}(t)$ for an electronic throttle used in the system of FIG. 1 and a control signal $u_{vgt}(t)$ for a VGT used in the system of FIG. 1 in accordance with another embodiment of the invention.

More particularly, referring to FIG. 4, another embodiment is shown having a throttle desired position signal $u_{throttle,predicted}$ position signal and a VGT control signal $u_{vgt,predicted}$ produced in response to engine operating conditions, for example, engine RPM, and a predicted torque demand determined by, for example, the anticipation of the future intake manifold pressure demand based on the previous driving history, GPS measurements and road grade maps, vehicle communication and traffic information systems as well as based on transmission shift commands as mentioned above. During the non-predict mode, switch $S_1$ is in a position so that the feedforward signal $u_{throttle,desired}$ is summed with the signal $e'_{throttle}$ as described above in connection with FIG. 2. In the predict mode, switch $S_1$ is in a position so that the predicted throttle signal $u_{throttle,predicted}$ is summed with the signal $e'_{throttle}$, as shown in FIG. 4. Also, during the non-predict mode, switch $S_2$ is in a position so that the sum of the signal $u_{vgt,desired}$ and the signal $e'_{vgt}(t)$ are used for the VGT control signal $u_{vgt}(t)$, as described above in connection with FIG. 2. During the predict mode, however, the switch $S_2$ is in a position such that the signal $u_{vgt,predicted}$ is used for the VGT control signal $u_{vgt}(t)$, as shown in FIG. 4.

Thus, for the above and FIG. 4, essentially the VGT feedback is disabled when the torque preview (i.e., predict) mode is active and the VGT feedforward command is adjusted to move the VGT to a more closed position than it otherwise would be. The throttle feedback remains active during the predict mode, but the throttle feedforward is adjusted to account for the change in VGT feedforward.

Figure 5:
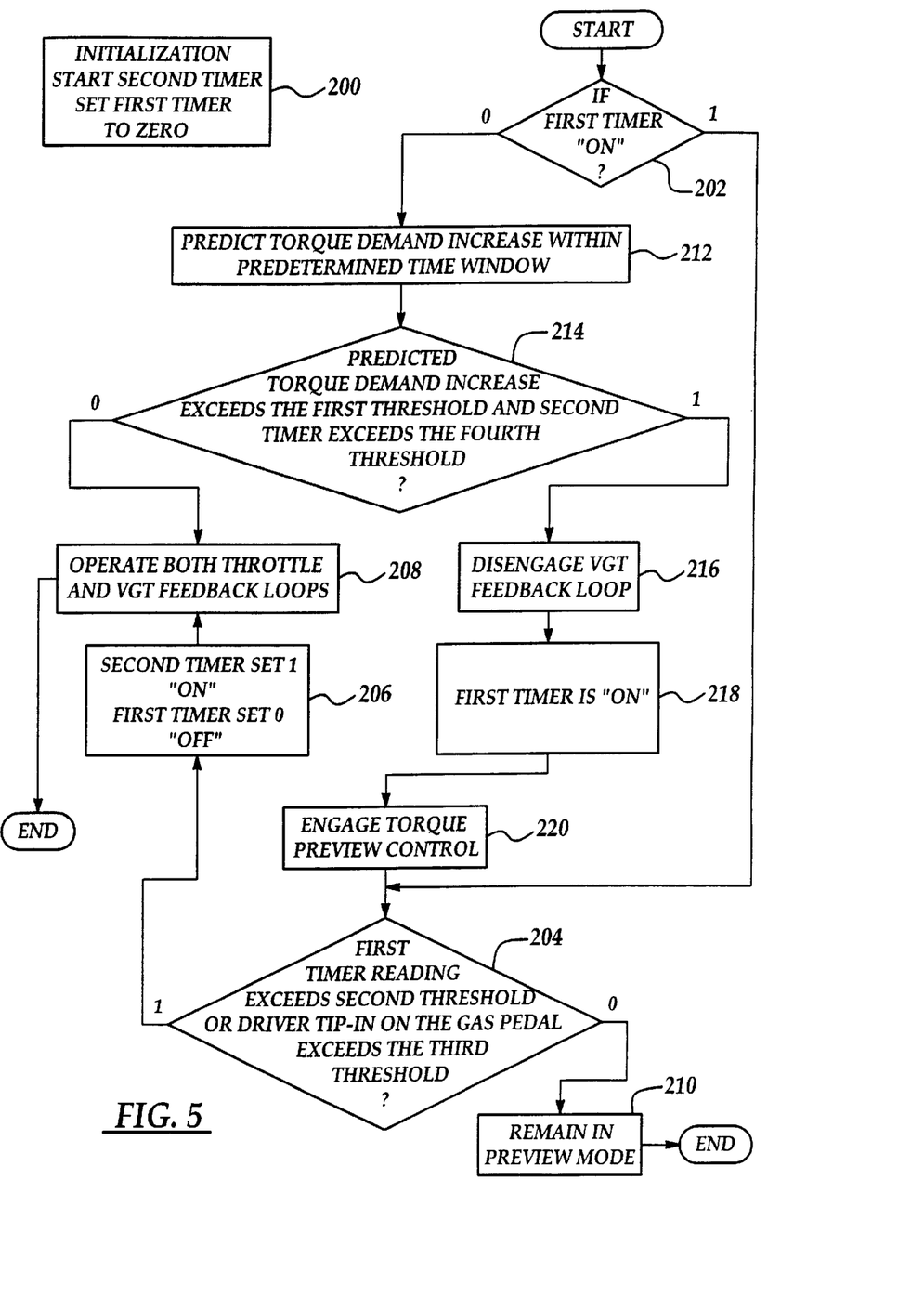
FIG. 5 is a flow diagram of a process performed computer code stored on a computer media in the ECU of the system of FIG. 1, such ECU when executing such code performing a process used with the block diagram of FIG. 4 to produce the control signal $u_{throttle}(t)$ for the electronic throttle used in the system of FIG. 1 and a control signal $u_{vgt}(t)$ for the VGT used in the system of FIG. 1.

Thus, referring to FIG. 5, the ECU 24 (FIG. 1) is programmed in accordance with the flow diagram shown therein. It is noted that there are two timers, not shown, in the ECU 24. In Step 200, there is an initialization of a first one of the two timers, here set to zero, and the second one of the two timers is started (i.e., turned "on"). The first timer is triggered when a torque preview scenario is identified; i.e., when there is a predict mode selected by the ECU 24. If the torque increase does not occur when predicted, the first timer is turned "off", and the system reverts to normal operation (i.e., non-predict mode). The second timer's function is to prevent a new entry into torque preview for an allotted amount of time, forcing the system to wait before triggering the first timer again. This prevents the system from 1) asking the control to change to a condition it is already in or 2) asking the control system to handle a situation it has already taken care of.

Thus, referring to FIG. 5, in Step 202, if the torque preview control is already active (i.e., the first timer is "on"), the process proceeds to step 204. In Step 204, if the first timer is expired, i.e., exceeded a predetermined threshold level (i.e., torque increase did not occur during this predetermined time) or if driver tip-in on the gas pedal exceeds a threshold level (i.e., the driver has requested more torque, thus the preview mode is no longer required since the torque request is coming from driver), the process proceeds to Step 206; otherwise, the process proceeds to Step 210. In Step 206, the first timer is turned "off" and the second timer is turned "on". The process proceeds to Step 208. Since there is no longer a need for the torque preview control mode, the process returns to normal operating mode. If the process had proceeded to Step 210, the system is in torque preview control (i.e., predict mode) where it remains.

If in Step 202, the first timer was "off", a prediction is made as to torque demand increase within pre-determined time window in the future (Step 212). The process then goes to Step 214. In Step 214, if the predicted torque increase is larger than a predetermined amount and the second timer is "off" (i.e. there has been sufficient time since the last torque preview situation), the VGT is disengaged (Step 216), the first timer is turned "on" (Step 218) and the torque preview control is engaged (Step 220). The process then proceeds to Step 204; otherwise the process proceeds to Step 208. That is, if the predicted torque demand increase exceeds a threshold and the second timer exceeds another threshold (Step 214), then the torque preview control described above is engaged (Steps 216, 218 and 220). In Steps 218 and 220, the first timer is turned "on" and the system enters the torque predict mode and operates the switches $S_1$ and $S_2$ shown in FIG. 4. It is to be noted that when the VGT is closed in advance but the torque demand increase did not materialize within a predetermined time window, the VGT may be driven back to its nominal setting (by an open loop control), while throttle is actively controlled with a feedback to isolate this VGT action from affecting the intake manifold pressure. Ultimately, the VGT control loop can be reengaged.

A number of embodiments of the invention have been described. Nevertheless, it will be understood that various modifications may be made without departing from the spirit and scope of the invention. For example, this invention can be applied to any turbocharging device with variable inlet flow. Accordingly, other embodiments are within the scope of the following claims.

What is claimed is:

1. A method for operating an engine control system, such engine system having an intake manifold and an exhaust manifold, exhaust gas in such exhaust manifold fed to a variable geometry turbine, such turbine being connected to a compressor, such compressor feeding air to the intake manifold through an electronically controlled throttle, such variable geometry turbine being controlled by a variable geometry turbine control signal, such electronically variable throttle being controlled by a throttle control signal, such method comprising:

combining a difference between an actual intake manifold pressure and a desired intake manifold pressure and a difference between an actual exhaust manifold pressure and a desired exhaust gas pressure into a composite signal to provide the variable geometry turbine control signal and the difference between the actual intake manifold pressure and the desired intake manifold pressure to produce the throttle control signal.

2. The method recited in claim 1 including predicting engine torque demand; and producing throttle and VGT commands as a function of the predicted engine torque during a prediction mode.

3. The method recited in claim 1 wherein the combining comprises:

determining a desired intake manifold pressure $p_{intake,desired}$ and a desired exhaust manifold pressure $p_{exhaust,desired}$;

measuring engine intake manifold pressure $p_{intake}$ and engine exhaust manifold pressure $p_{exhaust}$;

forming a first error signal $p_{intake}-p_{intake,desired}$ between a measured intake pressure $p_{intake,desired}$ and a desired intake pressure $p_{intake,desired}$ and a second error signal $p_{exhaust}-p_{exhaust,desired}$ between a desired exhaust manifold pressure intake pressure $p_{exhaust,desired}$ and a desired exhaust manifold pressure $p_{exhaust}$;

feeding a first function of the difference between the first error signal and the second error signal to the signal to the VGT;

feeding a second function of the first error signal to the throttle.

4. The method recited in claim 3 wherein the first function comprises forming a weighted sum signal $e_{vgt}$ as:

$$e_{vgt}=w\cdot(p_{intake}-p_{intake,desired})+(1-w)\cdot(p_{exhaust}-p_{exhaust,desired})$$

where w is a number between 0 and 1.

5. The method recited in claim 4, including:

forming a signal $e'_{vgt}(t)$ where $e'_{vgt}(t)$ is the formed signal $e_{vgt}$ multiplied by a gain $k_{p,vgt}$ and the integral state of the formed signal $e_{vgt}$ multiplied by $k_{i,vgt}$; and feeding the signal $e'_{vgt}(t)$ to the VGT.

6. The method recited in claim 5 including forming a signal $e'_{throttle}(t)$, where $e'_{throttle}(t)$ is the first error signal $p_{intake}-p_{intake,desired}$ multiplied by a gain $k_{p,throttle}$ and the integral state of the formed first error signal $p_{intake}-p_{intake,desired}$ multiplied by a gain $k_{i,throttle}$.

7. The article of manufacture recited in claim 6 wherein the storage medium includes code for predicting engine torque demand; and code for producing throttle and VGT commands as a function of the predicted engine torque during a prediction mode.

8. A method for operating an engine control system, such engine system having an intake manifold and an exhaust manifold, exhaust gas in such exhaust manifold fed to a variable geometry turbine, such turbine being connected to a compressor, such compressor feeding air to the intake manifold through an electronically controlled throttle, such variable geometry turbine being controlled by a variable geometry turbine control signal, such electronically variable throttle being controlled by a throttle control signal, such method comprising:

determining engine torque demand and engine speed;

determining from the determined torque demand and engine speed a desired intake manifold pressure $p_{intake,desired}$ and a desired exhaust manifold pressure $p_{exhaust,desired}$;

determining a feed forward throttle signal $u_{throttle,desired}$ and a feed forward VGT signal $u_{vgt,desired}$ in accordance with the measured engine speed and determined desired intake manifold pressure $p_{intake,desired}$;

measuring engine intake manifold pressure $p_{intake}$ and engine exhaust manifold pressure $p_{exhaust}$;

forming a first error signal $p_{intake}-p_{intake,desired}$ between measured and the desired intake pressure and a second error signal $p_{exhaust}-p_{exhaust,desired}$;

forming a weighted sum signal $e_{vgt}$ as:

$$e_{vgt}=w\cdot(p_{intake}-p_{intake,desired})+(1-w)\cdot(p_{exhaust}-p_{exhaust,desired})$$

where w is a number between 0 and 1;

combining the determined feed forward throttle signal $u_{throttle,desired}$, with the formed first error signal $p_{intake}-p_{intake,desired}$ multiplied by a gain $k_{p,throttle}$ and the integral state of the formed first error signal $p_{intake}-p_{intake,desired}$ multiplied by a gain $k_{i,throttle}$ to produce a signal $e'_{throttle}(t)$;

combining the determined feed forward VGT signal $u_{vgt,desired}$ with a signal $e'_{vgt}(t)$ where $e'_{vgt}(t)$ is the formed signal $e_{vgt}$ multiplied by a gain $k_{p,vgt}$ and the integral state of the formed signal $e_{vgt}$ multiplied by $k_{i,vgt}$;

adding the signal e'$_{throttle}$(t) to the determined feed forward signal u$_{throttle,desired}$ to produce a first composite signal u$_{throttle}$;

feeding such first composite signal to the throttle;

adding the signal e'$_{vgt}$(t) to the signal u$_{vgt}$(t) to produce a second composite signal u$_{vgt}$(t);

feeding such second composite signal u$_{vgt}$(t) to the VGT.

9. An article of manufacture, comprising:

a computer storage medium having a computer program encoded therein for executing a method for operating a engine control system, such engine system having an intake manifold and an exhaust manifold, exhaust gas in such exhaust manifold fed to a variable geometry turbine, such turbine being connected to a compressor, such compressor feeding air to the intake manifold through an electronically controlled throttle, such variable geometry turbine being controlled by a variable geometry turbine control signal, such electronically variable throttle being controlled by a throttle control signal, such computer storage medium comprising:

code for combining a difference between an actual intake manifold pressure and a desired intake manifold pressure and a difference between an actual exhaust manifold pressure and a desired exhaust gas pressure into a composite signal to provide the variable geometry turbine control signal and the difference between the actual intake manifold pressure and the desired intake manifold pressure to produce the throttle control signal.

10. An article of manufacture, comprising:

a computer storage medium having a computer program encoded therein for executing a method for operating a engine control system, such engine system having an intake manifold and an exhaust manifold, exhaust gas in such exhaust manifold fed to a variable geometry turbine, such turbine being connected to a compressor, such compressor feeding air to the intake manifold through an electronically controlled throttle, such variable geometry turbine being controlled by a variable geometry turbine control signal, such electronically variable throttle being controlled by a throttle control signal, such storage medium comprising:

code for determining engine torque demand and engine speed;

code for determining from the determined torque demand and engine speed a desired intake manifold pressure p$_{intake,desired}$ and a desired exhaust manifold pressure p$_{exhaust,desired}$;

code for determining a feed forward throttle signal u$_{throttle,desired}$ and a feed forward VGT signal u$_{vgt,desired}$ in accordance with the measured engine speed and determined desired intake manifold pressure p$_{intake,desired}$;

code for measuring engine intake manifold pressure p$_{intake}$ and engine exhaust manifold pressure p$_{exhaust}$;

code for forming a first error signal p$_{intake}$−p$_{intake,desired}$ between measured and the desired intake pressure and a second error signal p$_{exhaust}$−p$_{exhaust,desired}$;

code for forming a weighted sum signal e$_{vgt}$ as:

$$e_{vgt}=w \cdot (p_{intake}-p_{intake,desired})+(1-w) \cdot (p_{exhaust}-p_{exhaust,desired}),$$

where w is a number between 0 and 1;

code for combining the determined feed forward throttle signal u$_{throttle,desired}$, with the formed first error signal p$_{intake}$−p$_{intake,desired}$ multiplied by a gain k$_{p,throttle}$ and the integral state of the formed first error signal p$_{intake}$−p$_{intake,desired}$ multiplied by a gain k$_{i,throttle}$ to produce a signal e'$_{throttle}$(t);

code for combining the determined feed forward VGT signal u$_{vgt,desired}$ with a signal e'$_{vgt}$(t) where e'$_{vgt}$(t) is the formed signal e$_{vgt}$ multiplied by a gain k$_{p,vgt}$ and the integral state of the formed signal e$_{vgt}$ multiplied by k$_{i,vgt}$;

code for adding the signal e'$_{throttle}$(t) to the determined feed forward signal u$_{throttle,desired}$ to produce a first composite signal u$_{throttle}$;

code for feeding such first composite signal to the throttle;

code for adding the signal e'$_{vgt}$(t) to the signal u$_{vgt}$(t) to produce a second composite signal u$_{vgt}$(t);

code for feeding such second composite signal u$_{vgt}$(t) to the VGT.

11. An engine control system comprising:

an engine having:
  an intake manifold;
  an exhaust manifold;
  a compressor;
  an electronically controllable throttle;
  a variable geometry turbine fed by exhaust in such exhaust manifold, such turbine being connected to the compressor;
  wherein the compressor feeds air to the intake manifold through an electronically controlled throttle, such variable geometry turbine being controlled by a variable geometry turbine control signal, such electronically variable throttle being controlled by a throttle control signal a processor for combining a difference between an actual intake manifold pressure and a desired intake manifold pressure and a difference between an actual exhaust manifold pressure and a desired exhaust gas pressure into a composite signal to provide the variable geometry turbine control signal and the difference between the actual intake manifold pressure and the desired intake manifold pressure to produce the throttle control signal.

12. The system recited in claim 11 wherein the processor:

forms a first error signal p$_{intake}$−p$_{intake,desired}$ between a measured intake pressure p$_{intake,desired}$ and a desired intake pressure p$_{intake,desired}$ and a second error signal p$_{exhaust}$−p$_{exhaust,desired}$ between a desired exhaust manifold pressure intake pressure p$_{exhaust,desired}$ and a desired exhaust manifold pressure p$_{exhaust}$;

feeds a first function of the difference between the first error signal and the second error signal to the signal to the VGT;

feeds a second function of the first error signal to the throttle.

13. The system recited in claim 12 wherein the first function comprises forming a weighted sum signal e$_{vgt}$ as:

$$e_{vgt}=w \cdot (p_{intake}-p_{intake,desired})+(1-w) \cdot (p_{exhaust}-p_{exhaust,desired})$$

where w is a number between 0 and 1.

14. The system recited in claim 13 wherein the processor:

forms a signal e'$_{vgt}$(t) where e'$_{vgt}$(t) is the formed signal e$_{vgt}$ multiplied by a gain k$_{p,vgt}$ and the integral state of the formed signal e$_{vgt}$ multiplied by k$_{i,vgt}$; and feeds the signal e'$_{vgt}$(t) to the VGT.

15. The system recited in claim 14 wherein the processor forms a signal e'$_{throttle}$(t), where e'$_{throttle}$(t) is the first error signal p$_{intake}$−p$_{intake,desired}$ multiplied by a gain k$_{p,throttle}$ and the integral state of the formed first error signal p$_{intake}$−p$_{intake,desired}$ multiplied by a gain k$_{i,throttle}$.

* * * * *